United States Patent
Guo

(10) Patent No.: US 7,898,471 B2
(45) Date of Patent: Mar. 1, 2011

(54) POWER-SAVING POSITION TRACKING DEVICE

(75) Inventor: Pao-Lin Guo, Taichung (TW)

(73) Assignee: GTA Electronics Co., Ltd. (TW)

( * ) Notice: Subject to any disclaimer, the term of this patent is extended or adjusted under 35 U.S.C. 154(b) by 173 days.

(21) Appl. No.: 12/430,344

(22) Filed: Apr. 27, 2009

(65) Prior Publication Data

US 2010/0271260 A1     Oct. 28, 2010

(51) Int. Cl.
    *G01S 19/45*     (2010.01)
    *G01S 19/46*     (2010.01)
    *G01S 19/48*     (2010.01)

(52) U.S. Cl. .......... 342/357.28; 342/357.29; 342/357.31

(58) Field of Classification Search ............ 342/357.28, 342/357.29, 357.31
See application file for complete search history.

(56) References Cited

U.S. PATENT DOCUMENTS

| 2006/0063560 A1* | 3/2006 | Herle ...................... 455/552.1 |
| 2009/0111485 A1* | 4/2009 | Kitani ...................... 455/456.1 |
| 2009/0207042 A1* | 8/2009 | Park et al. ............... 340/870.02 |

* cited by examiner

*Primary Examiner* — Thomas H Tarcza
*Assistant Examiner* — Harry Liu
(74) *Attorney, Agent, or Firm* — Schmeiser, Olsen & Watts, LLP

(57) ABSTRACT

A power-saving position tracking device includes a central processing unit; a short-distance wireless communication unit, for establishing a wireless connection with a short-distance wireless transceiver to perform a position tracking; a GPS receiving unit, for receiving a satellite signal for performing a position tracking and outputting position information; a mobile communication unit, for transmitting the position information to a remote control center. If a signal intensity of a wireless connection between the power-saving position tracking device and the short-distance wireless transceiver is greater than a threshold, the GPS receiving unit and the mobile communication unit will enter into a power saving mode; on the other hand, if the wireless connection signal intensity is smaller than the threshold, the short-distance wireless communication unit will enter into the power saving mode to achieve the power-saving effect.

14 Claims, 2 Drawing Sheets

POWER-SAVING POSITION TRACKING DEVICE

FIELD OF THE INVENTION

The present invention relates to a position tracking device, in particular to a power-saving position tracking device.

BACKGROUND OF THE INVENTION

A position tracking device can be used for tracking the position of a target. For example, the position tracking device is installed onto a cash box for the transport of bank notes to facilitate a remote control center to timely know about the current situation of the cash box.

In general, the position tracking device has a structure mainly composed of a GSM communication module and a GPS positioning module. The GPS positioning module is used for receiving signals of a positioning satellite to obtain position information of a position tracking device, and the GSM communication module is used for transmitting the position information to a remote control center.

However, the GPS positioning module and the GSM communication module consume much electric power during their operation, and the GPS positioning module usually has difficulties to receive the satellite signal in an indoor environment and always situates at a condition of searching the satellite signal and attempting to carry out the positioning process, and thus further consuming more electric power.

Therefore, it is a major technical issue for related designers and manufacturers to enhance the endurance of a position tracking device.

SUMMARY OF THE INVENTION

In view of the aforementioned shortcomings of the prior art, the inventor of the present invention based on years of experience in the related industry to conduct extensive researches and experiments, and finally developed a power-saving position tracking device in accordance with the present invention.

Therefore, it is a primary objective of the present invention to install a short-distance wireless communication unit, and the short-distance wireless communication unit establishes a wireless connection with a short-distance wireless transceiver and it is applicable for indoor environments. A received signal strength indication (RSSI) transmitted from an adjacent short-distance wireless transceiver is used for determining the position of a position tracking device, and the operation of such indoor positioning system consumes much less power than the GPS positioning module, and its cost is less than one-tenth of the GPS positioning module. What is more, this positioning system can be used anywhere with a short-distance wireless network.

Another objective of the present invention is to switch the positioning functions between a short-distance wireless network and a GPS to achieve the power saving effect. In other words, if the position tracking device is able to receive a signal of the wireless network, the GPS positioning function will enter into a power saving mode, and if the position tracking device can receive a weak signal of a short-distance wireless network, the positioning function of the short-distance wireless network will enter into the power saving mode, and the GPS positioning function will take over.

To achieve the foregoing objectives, the present invention provides a power-saving position tracking device comprising: a central processing unit; a short-distance wireless communication unit, electrically coupled to the central processing unit, for establishing a wireless connection with a short-distance wireless transceiver to track the position of the power-saving position tracking device; a GPS receiving unit, electrically coupled to the central processing unit, for receiving a satellite signal to position the power-saving position tracking device and output position information; and a mobile communication unit, electrically coupled to the central processing unit, for transmitting the position information to a remote control center; wherein if the signal intensity of a wireless connection between the power-saving position tracking device and the short-distance wireless transceiver is greater than a threshold, the central processing unit will drive the GPS receiving unit and the mobile communication unit to enter into a power saving mode. On the other hand, if the signal intensity of the wireless connection between the power-saving position tracking device and the short-distance wireless transceiver is smaller than the threshold, the central processing unit will drive the short-distance wireless communication unit to enter into the power saving mode.

In a preferred embodiment of the present invention, the short-distance wireless communication unit is a Zigbee wireless communication unit, and the short-distance wireless transceiver is a Zigbee wireless transceiver.

In a preferred embodiment of the present invention, the short-distance wireless transceiver is installed at a location inside a construction.

In a preferred embodiment of the present invention, the short-distance wireless transceiver is installed at a location inside a motor vehicle, and the motor vehicle includes an automobile GPS receiving unit and an automobile mobile communication unit installed inside the motor vehicle, and the automobile mobile communication unit is provided for transmitting the position information produced by the automobile GPS receiving unit to the remote control center.

In a preferred embodiment of the present invention, the communication mode of the mobile communication unit or the automobile mobile communication unit includes GPRS, WiFi, GSM, 3G, HSDPA or WiMax.

In a preferred embodiment of the present invention, the threshold refers to the minimum of a wireless connection between the power-saving position tracking device and the short-distance wireless transceiver for transmitting signals normally.

In a preferred embodiment of the present invention, the power saving mode is an off mode.

In a preferred embodiment of the present invention, the power saving mode is a low power consuming mode.

In a preferred embodiment of the present invention, the power-saving position tracking device is a portable position tracking device.

In a preferred embodiment of the present invention, the short-distance wireless transceiver transmits a position tracking result to a short-distance wireless network control center, and the short-distance wireless network control center transmits the position tracking result to the remote control center.

In a preferred embodiment of the present invention, an operation integrating unit is provided for integrating the central processing unit with the GPS receiving unit or integrating the central processing unit with the mobile communication unit. The central processing unit, the GPS receiving unit or the mobile communication unit in the operation integrating unit carries out its originally intended function.

In a preferred embodiment of the present invention, the remote control center is a mobile communication device.

The power-saving position tracking device of the invention can switch between the short-distance wireless positioning function and the GPS positioning function effectively to achieve the power saving effect.

DESCRIPTION OF THE PREFERRED EMBODIMENTS

The objects, features and advantages of the present invention will become apparent from the following detailed description taken with the accompanying drawings.

Figure 1:
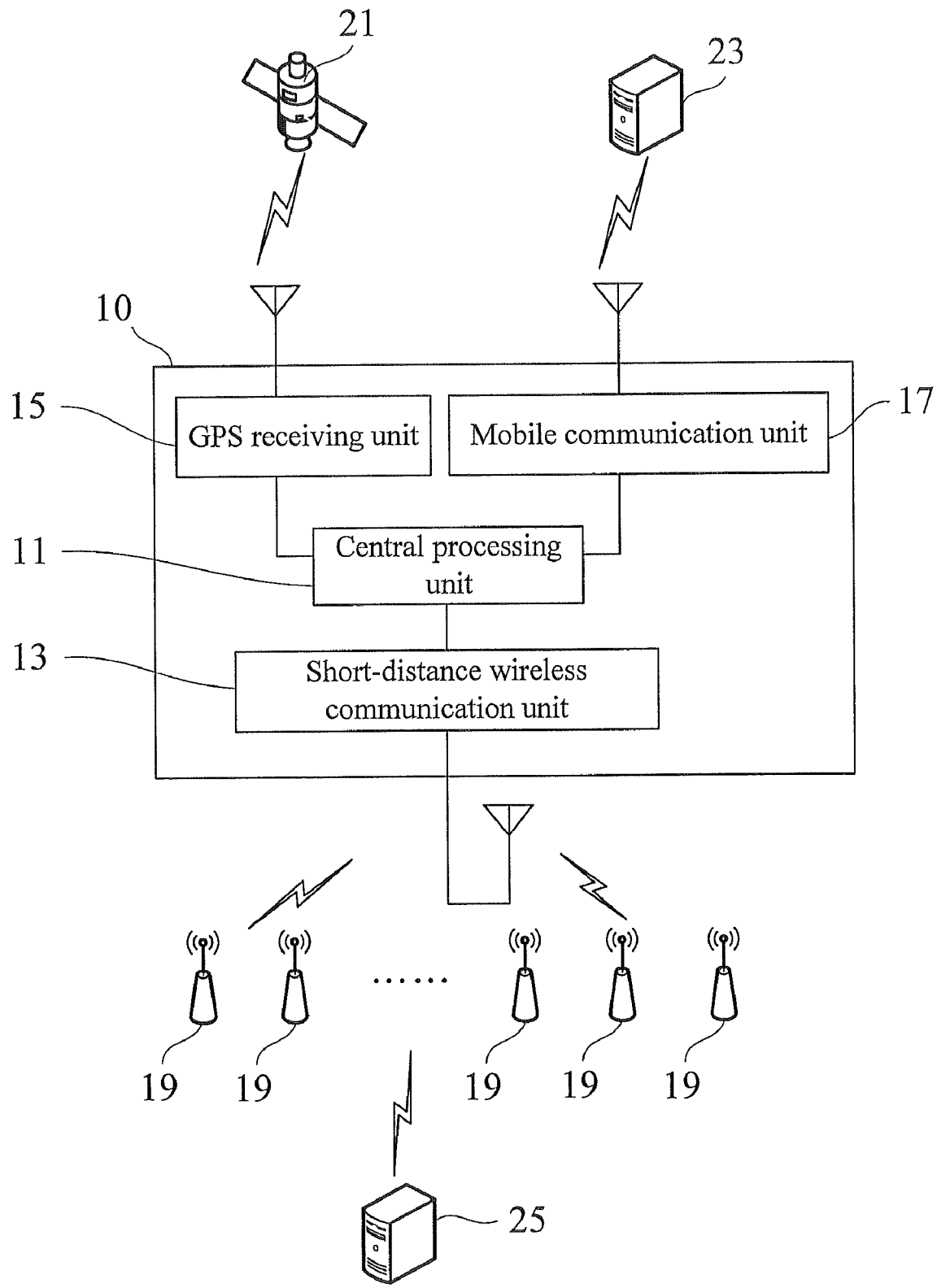
FIG. 1 is a schematic view of using a power-saving position tracking device in accordance with a preferred embodiment of the present invention.

With reference to FIG. 1 for a schematic view of using a power-saving position tracking device in accordance with a preferred embodiment of the present invention, the power-saving position tracking device 10 comprises: a central processing unit 11, a short-distance wireless communication unit 13, a GPS receiving unit 15 and a mobile communication unit 17. The power-saving position tracking device 10 is a portable position tracking device, or a position tracking device installed to a specific device.

The short-distance wireless communication unit 13 is electrically coupled to the central processing unit 11 for establishing a wireless connection with a short-distance wireless transceiver 19 and positioning the power-saving position tracking device 10. The short-distance wireless transceiver 19 can be installed inside a construction and a motor vehicle, wherein the construction includes a plurality of short-distance wireless transceivers 19 to form a wireless network inside the construction to facilitate the power-saving position tracking device 10 to perform an indoor positioning function.

In a preferred embodiment of the present invention, the short-distance wireless communication unit 13 is a Zigbee wireless communication unit, and the short-distance wireless transceiver 19 is a Zigbee wireless transceiver. Zigbee is a low-power radio-frequency component, whose positioning engine calculates its position according to a received signal strength indication (RSSI) transmitted from an adjacent wireless device within a wireless network. The known position of the Zigbee wireless transceiver in the wireless network is called a reference node, and the required calculating position of a node is called a measuring mode, (wherein the Zigbee wireless communication unit is the power-saving position tracking device 10). The only required information to be transmitted between the reference node and the measuring node are the coordinates of the reference node. The positioning engine will calculate the RSSI according to the transmitted information, and use the received coordinates to calculate the position of the measuring node in order to position the power-saving position tracking device 10. A short-distance wireless network control center 25 (which is the Zigbee wireless network control center) in the construction will transmit the position information to a remote control center 23 through a general communication method (via a cable transmission or a wireless mobile communication transmission).

The GPS receiving unit 15 is electrically coupled to the central processing unit 11 for receiving a signal of a positioning satellite 21 and outputting position information, and the position information is coordinate information of the location of the power-saving position tracking device 10.

The mobile communication unit 17 is electrically coupled to the central processing unit 11 and operated together with the GPS receiving unit 15 for transmitting the position information to the remote control center 23.

On the other hand, the short-distance wireless transceiver 19 can be installed in a motor vehicle, and the motor vehicle includes an automobile GPS receiving unit (not shown in the figure) and an automobile mobile communication unit (not shown in the figure) installed in the motor vehicle. If the power-saving position tracking device 10 is in the motor vehicle, the short-distance wireless transceiver 19 will connect the short-distance wireless communication unit 13 of the power-saving position tracking device 10, and the automobile GPS receiving unit will track the position of the motor vehicle. Since the power-saving position tracking device 10 is located inside the motor vehicle, the coordinate information of the power-saving position tracking device 10 is the same as the coordinate information of the motor vehicle. The automobile mobile communication unit will transmit the coordinate information of the motor vehicle to the remote control center 23. In addition, the automobile GPS receiving unit and the automobile mobile communication unit of the motor vehicle simply use the automobile power supply of the motor vehicle instead of the built-in power supply of the power-saving position tracking device 10.

Figure 2:
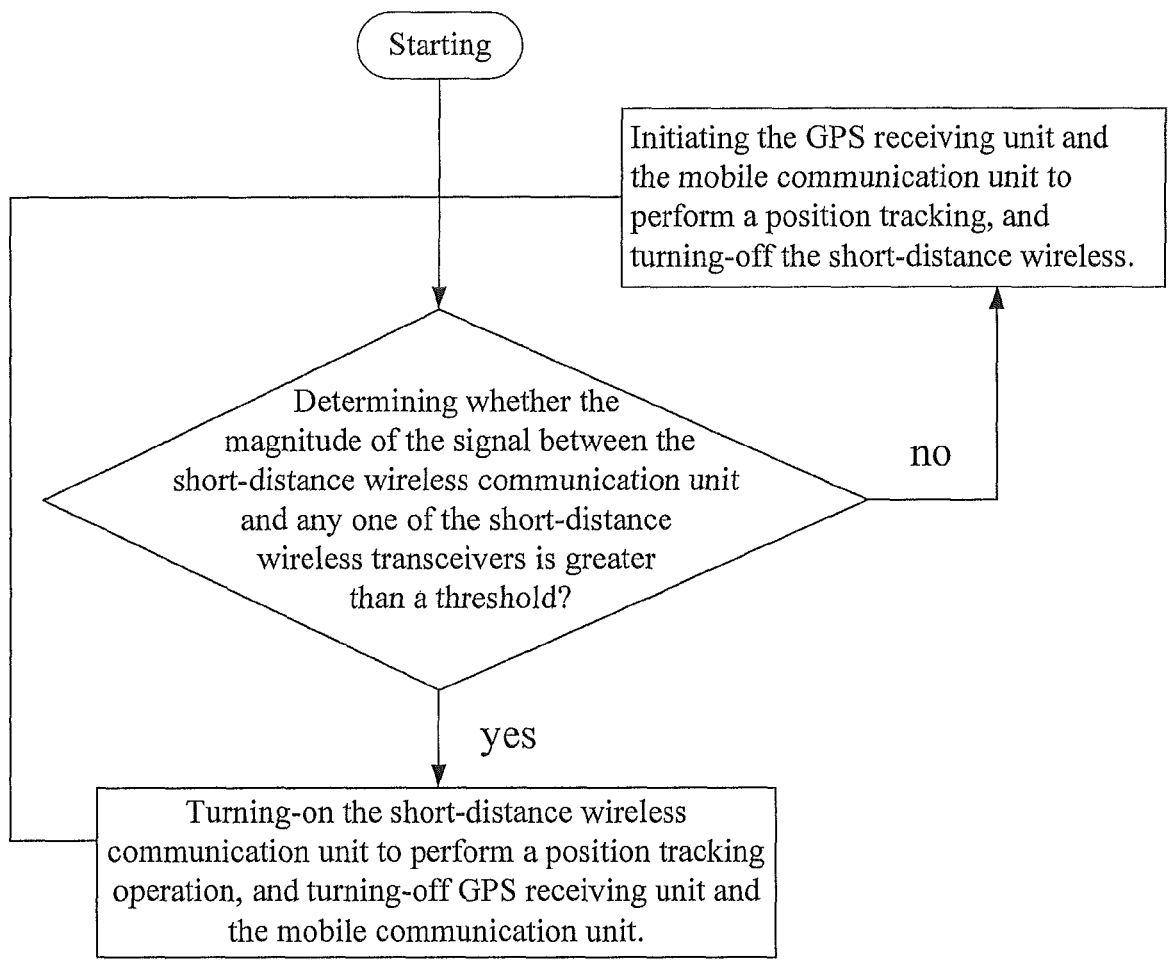
FIG. 2 is a flow chart of operating a power-saving position tracking device in accordance with a preferred embodiment of the present invention.

With reference to FIG. 2 for a flow chart of operating a power-saving position tracking device in accordance with a preferred embodiment of the present invention, the central processing unit 11 determines whether or not the signal intensity of a connection between the short-distance wireless communication unit 13 and the a short-distance wireless transceiver 19 is greater than a threshold, wherein the threshold refers to the minimum of a wireless connection between the short-distance wireless communication unit 13 and any one of the short-distance wireless transceivers 19 for transmitting signals normally.

If the signal intensity is greater than the threshold, it means that the short-distance wireless communication can complete the positioning function, and the central processing unit 11 will just turn on the short-distance wireless communication unit 13 to drive the GPS receiving unit 15 and the mobile communication unit 17 to enter into a power saving mode.

If the signal intensity is smaller than the threshold, it means that the short-distance wireless communication cannot complete the positioning function, and it is necessary to use the GPS receiving unit 15 to complete the job. Therefore, the central processing unit 11 will just turn on the GPS receiving unit 15 and the mobile communication unit 17 to drive the short-distance wireless communication unit 13 to enter into a power saving mode.

The power saving mode is an off mode that completely disconnects the power required by the device, or a low power consuming mode capable of restarting the device quickly. The low power consuming mode can be a sleep mode.

Regardless of the position information produced by the GPS receiving unit or by the short-distance wireless communication, the position information is transmitted to the remote control center 23.

The position tracking device installed onto a cash box of a bank system is used as an example for illustrating the present invention as follows. With reference to Table 1, the cash box is transported from Bank A to Bank B, wherein the mobile communication unit 17 is a GSM communication device.

TABLE 1

| Position | Cash Box | | | | |
| --- | --- | --- | --- | --- | --- |
| | (1) In Bank A | (2) Leaves Bank A | (3) In armored vehicle | (4) Leaves armored vehicle | (5) In Bank B |
| GPS | Off | On | Off | On | Off |
| Zigbee | On | Off | On | Off | On |
| GSM | Off | On | Off | On | Off |

In Table 1, "On" and "Off" represent the power conditions of each device of the GPS, Zigbee and GSM in the power-saving position tracking device 10, wherein "On" stands for the situation of entering into a power saving mode or exiting the power saving mode to enter into a power-on state, and "Off" stands for the situation of entering into the power saving mode to exit the power-on state.

In the whole process, (1) The cash box is brought out from Bank A; (2) the cash box is collected by a security guard who is leaving Bank A and ready to put the cash box into an armored vehicle; (3) The cash box is placed in the armored vehicle and on the way to Bank B; (4) The armored vehicle arrives Bank B, and the security guard carries the cash box from the armored vehicle to Bank B; and (5) the cash box is brought to Bank B by the security guard.

From Table 1, we can see that the entire tracking process can be achieved, while the GPS device that consumes more power is turned off most of the time, and the Zigbee device that consumes less power is turned on most of the time. If the cash box is robbed during the cash transport process, the devices will enter into Situation (2) or (4). In other words, the central processing unit 11 will be unable to use Zigbee to connect the automobile short-distance wireless transceiver in the armored vehicle. Now, the GPS device will be turned on, and the Zigbee will be turned off, and the GSM device will be turned on. The position information of the cash box can be transmitted to the remote control center 23 through the GPS device and the GSM device.

For those skilled in the art, it is noteworthy to point out that a single chip can include powerful computing functions, as the integrated chip technology advances, and thus the present invention can further comprise an operation integrating unit (not shown in the figure) for integrating the central processing unit 11 with the GPS receiving unit 15, or integrating the central processing unit 11 with the mobile communication unit 17. The integrated operation integrating unit becomes a single chip set that can execute the originally intended function of the central processing unit 11, the GPS receiving unit 15 or the mobile communication unit 17. In other words, the integrated operation integrating unit includes the central processing unit 11, the GPS receiving unit 15 and the mobile communication unit 17.

The remote control center 23 of the invention further includes a mobile communication device (not shown in the figure) such as a mobile phone, a personal digital assistant (PDA), or any other mobile communication device to meet the requirement of monitoring a target anytime, While the invention has been described by means of specific embodiments, numerous modifications and variations could be made thereto by those skilled in the art without departing from the scope and spirit of the invention set forth in the claims.

What is claimed is:

1. A power-saving position tracking device, comprising:
a central processing unit;
a short-distance wireless communication unit, electrically coupled to the central processing unit, for establishing a wireless connection with a short-distance wireless transceiver, and tracking the position of the power-saving position tracking device;
a GPS receiving unit, electrically coupled to the central processing unit, for receiving a satellite signal to position the power-saving position tracking device and output position information; and
a mobile communication unit, electrically coupled to the central processing unit, for transmitting the position information to a remote control center;
wherein, if a signal intensity of the wireless connection between the power-saving position tracking device and the short-distance wireless transceiver is greater than a threshold, then the central processing unit will drive the GPS receiving unit and the mobile communication unit to enter into a power saving mode; on the other hand, if the signal intensity of the wireless connection between the power-saving position tracking device and the short-distance wireless transceiver is smaller than a threshold, then the central processing unit will drive the short-distance wireless communication unit to enter into a power saving mode.

2. The power-saving position tracking device of claim 1, wherein the short-distance wireless communication unit is a Zigbee wireless communication unit, and the short-distance wireless transceiver is a Zigbee wireless transceiver.

3. The power-saving position tracking device of claim 1, wherein the short-distance wireless transceiver is installed inside a construction.

4. The power-saving position tracking device of claim 1, wherein the short-distance wireless transceiver is installed inside a motor vehicle, and the motor vehicle includes an automobile GPS receiving unit and an automobile mobile communication unit installed in the motor vehicle, and the automobile mobile communication unit is provided for transmitting position information produced by the automobile GPS receiving unit to the remote control center.

5. The power-saving position tracking device of claim 4, wherein the automobile mobile communication unit adopts a communication mode selected from the collection of GPRS, WiFi, GSM, 3G, HSDPA and WiMax.

6. The power-saving position tracking device of claim 1, wherein the mobile communication unit adopts a communication mode selected from the collection of GPRS, WiFi, GSM, 3G, HSDPA and WiMax.

7. The power-saving position tracking device of claim 1, wherein the threshold refers to the minimum of a wireless connection between the power-saving position tracking device and the short-distance wireless transceiver for transmitting a signal normally.

8. The power-saving position tracking device of claim 1, wherein the power saving mode is an off mode.

9. The power-saving position tracking device of claim 1, wherein the power saving mode is a low power consuming mode.

10. The power-saving position tracking device of claim 1, wherein the power-saving position tracking device is a portable position tracking device.

11. The power-saving position tracking device of claim 1, wherein the short-distance wireless transceiver transmits a position tracking result to a short-distance wireless network control center, and the short-distance wireless network control center transmits the position tracking result to the remote control center.

12. The power-saving position tracking device of claim 1, further comprising an operation integrating unit for integrating the central processing unit with the GPS receiving unit, or integrating the central processing unit with the mobile communication unit, and the central processing unit, the GPS receiving unit or the mobile communication unit in the operation integrating unit executes its originally intended function.

13. The power-saving position tracking device of claim 1, wherein the remote control center is a mobile communication device.

14. The power-saving position tracking device of claim 12, wherein the remote control center is a mobile communication device.

* * * * *